(12) United States Patent
Ide

(10) Patent No.: US 8,126,637 B2
(45) Date of Patent: Feb. 28, 2012

(54) CONTROL SYSTEM FOR INTERNAL COMBUSTION ENGINE

(75) Inventor: Hirohito Ide, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 12/605,619

(22) Filed: Oct. 26, 2009

(65) Prior Publication Data

US 2010/0131176 A1 May 27, 2010

(30) Foreign Application Priority Data

Nov. 21, 2008 (JP) ................................ 2008-297495

(51) Int. Cl.
*F02D 41/22* (2006.01)
(52) U.S. Cl. .................... 701/107; 123/90.11; 123/90.15
(58) Field of Classification Search .................. 701/107; 123/90.11–90.12, 90.15–90.18; 73/114.26, 73/114.31, 114.36, 114.79
See application file for complete search history.

(56) References Cited

U.S. PATENT DOCUMENTS

| | | | |
|---|---|---|---|
| 6,883,476 B1 | 4/2005 | Nohara et al. | |
| 7,293,537 B2 * | 11/2007 | Arai et al. | 123/90.16 |
| 7,308,871 B2 * | 12/2007 | Machida | 123/90.15 |
| 7,761,221 B2 * | 7/2010 | Abe et al. | 701/105 |
| 7,765,041 B2 * | 7/2010 | Tatsumi et al. | 701/29 |
| 7,921,711 B2 * | 4/2011 | Noda | 73/114.79 |
| 7,938,100 B2 * | 5/2011 | Takahashi et al. | 123/346 |
| 2003/0010302 A1 * | 1/2003 | Ilzuka et al. | 123/90.16 |
| 2006/0178803 A1 | 8/2006 | Nakamura | |

FOREIGN PATENT DOCUMENTS

| | | |
|---|---|---|
| EP | 2080872 A2 | 7/2009 |
| JP | 10-009036 | 1/1998 |
| JP | 2003083149 | 3/2003 |
| JP | 2004048875 | 2/2004 |
| JP | 2007037336 | 2/2007 |

* cited by examiner

*Primary Examiner* — Hai Huynh
(74) *Attorney, Agent, or Firm* — Squire Sanders (US) LLP

(57) ABSTRACT

A control system for an internal combustion engine having a valve operating characteristic varying mechanism for continuously changing a lift amount of at least one intake valve of the engine. The valve operating characteristic varying mechanism includes a control shaft for changing the lift amount, a motor for rotating the control shaft, and a transmission mechanism provided between an output shaft of the motor and the control shaft for transmitting an actuating force of the motor to the control shaft. A first rotational angle sensor detects a rotational angle of the output shaft of the motor, and a second rotational angle sensor detects a rotational angle of the control shaft. A control of the lift amount of the at least one intake valve is performed according to the rotational angle detected by the first rotational angle sensor or the second rotational angle sensor. A failure diagnosis of the first rotational angle sensor, the second rotational angle sensor, and the transmission mechanism is performed based on the rotational angles detected by the first and second rotational angle sensors.

20 Claims, 9 Drawing Sheets

FIG. 3A
FIG. 3B
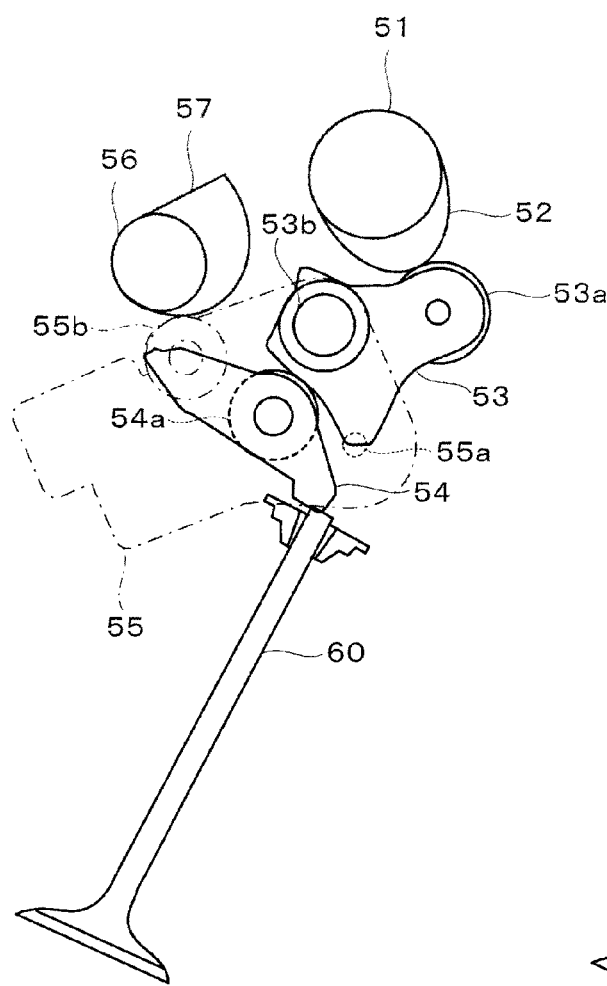
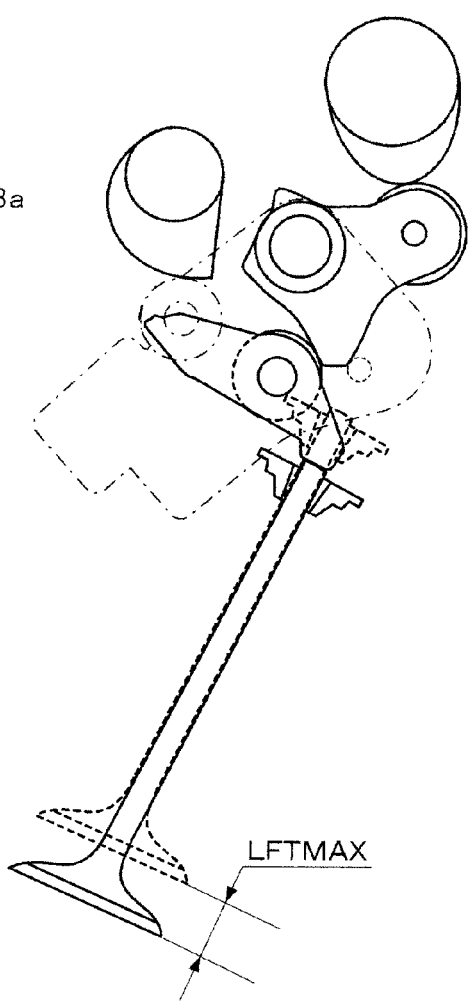

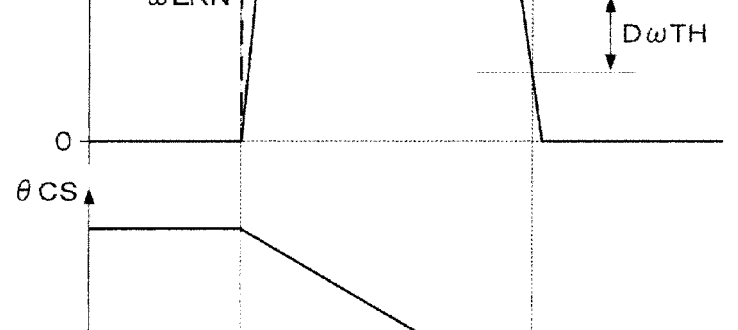
FIG. 7A
FIG. 7B
FIG. 7C
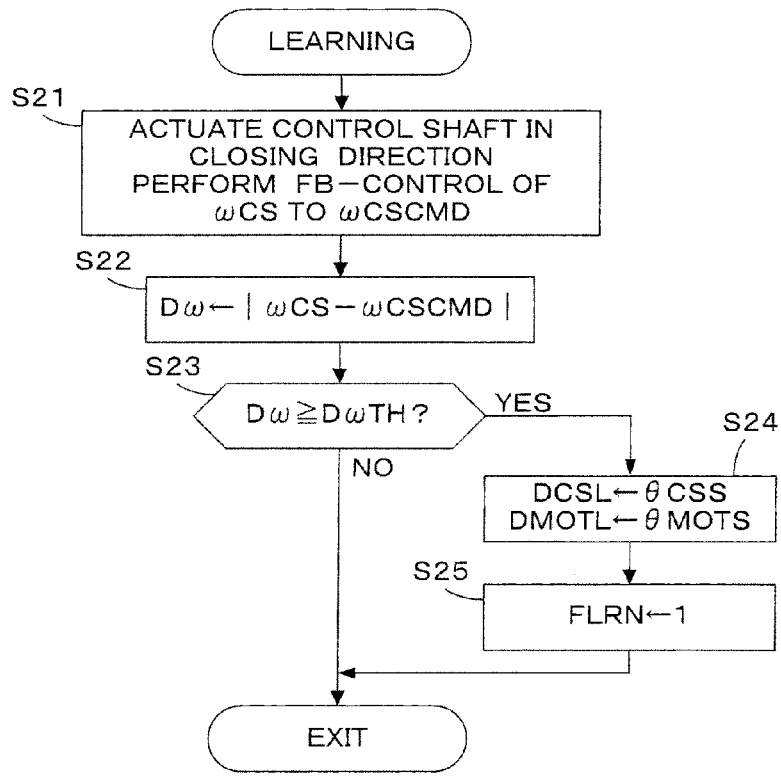
FIG. 8

CONTROL SYSTEM FOR INTERNAL COMBUSTION ENGINE

BACKGROUND

1. Field

The present invention relates to a control system for an internal combustion engine having a valve operating characteristic varying mechanism for continuously varying a lift amount of the intake valve(s), and particularly to a control system having a failure diagnosis function for the valve operating characteristic varying mechanism.

2. Description of the Related Art

Japanese Patent Publication No. 3463463 (JP'463) discloses a diagnosis apparatus for diagnosing an abnormality of a plurality of sensors for detecting a same object parameter, based on the outputs of the plurality of sensors. According to this apparatus, an offset is prepared for at least one of the minimum value side and the maximum value side of the output characteristic of the sensor, and the reference points of the sensor outputs are corrected by adjusting the offset(s) of each sensor. With this correction, incorrect diagnosis due to differences among the reference points of the plurality of sensors is prevented.

If the apparatus shown in the above-described JP'463 is applied to a valve operating characteristic varying mechanism which changes a lift amount of the intake valve(s) by actuating a control shaft with a motor connected to the control shaft via an actuating force transmission mechanism, the following effect is obtained. That is, if a plurality of sensors for detecting a rotational angle of the control shaft are provided, for example, reliability of the detected rotational angle can be improved and a failure diagnosis of the plurality of sensors can be performed. However, since the plurality of sensors detects a same object parameter, i.e., a rotational angle of the control shaft, it is impossible to diagnose a failure of the actuating force transmission mechanism for transmitting the actuating force to the control shaft.

SUMMARY

Certain embodiments of the present invention were made contemplating the above-described point, and an object of the invention is to provide a control system for an internal combustion engine, which uses a plurality of appropriately-mounted sensors, to perform not only a failure diagnosis of the plurality of sensors but also a failure diagnosis of the actuating force transmission mechanism in the valve operating characteristic varying mechanism for continuously changing a lift amount of the intake valve(s).

To attain the above object, an embodiment of the present invention provides a control system for an internal combustion engine having a valve operating characteristic varying mechanism (41, 43) for continuously changing a lift amount of at least one intake valve of the engine. The valve operating characteristic varying mechanism includes a control shaft (56) for changing the lift amount, a motor (43) for rotating the control shaft (56), and a transmission mechanism (71) provided between an output shaft (43a) of the motor (43) and the control shaft (56) for transmitting an actuating force of the motor (43) to the control shaft (56). The control system includes first rotational angle detecting means (72), second rotational angle detecting means (14), control means, and failure diagnosis means. The first rotational angle detecting means (72) detects a rotational angle ($\theta$MOT) of the output shaft of the motor and the second rotational angle detecting means (14) detects a rotational angle ($\theta$CS) of the control shaft. The control means performs a control of the lift amount of the at least one intake valve according to the rotational angle ($\theta$MOT, $\theta$CS) detected by the first rotational angle detecting means (72) or the rotational angle detecting means (14). The failure diagnosis means performs a failure diagnosis of the first rotational angle detecting means (72), the second rotational angle detecting means (14), and the transmission mechanism (71) based on the rotational angles ($\theta$MOT, $\theta$CS) detected by the first and second rotational angle detecting means.

With this configuration, the failure diagnosis of the first rotational angle detecting means, the second rotational angle detecting means, and the transmission mechanism is performed based on the rotational angles detected by the first rotational angle detecting means for detecting the rotational angle of the output shaft of the motor, and the second rotational angle detecting means for detecting the rotational angle of the control shaft. Since the rotational angles are detected by the rotational angle detecting means on both of the input and output sides of the transmission mechanism, it is possible to diagnose not only a failure of the rotational angle detecting means but also a failure of the transmission mechanism by comparing the detected values of the first and second rotational angle detecting means.

In other embodiments, the control system further includes correcting means for correcting the rotational angles detected by the first and second rotational angle detecting means, based on a relationship between the detected rotational angles and reference positions (fully-closed angle position) of the motor output shaft and the control shaft. The failure diagnosis means performs the failure diagnosis based on the rotational angles ($\theta$MOT, $\theta$CS) corrected by the correcting means.

With this configuration, the detected rotational angles are corrected based on the relationship between the rotational angles detected by the first and the second rotational angle detecting means and the reference positions of the motor output shaft and the control shaft, and the failure diagnosis is performed based on the corrected rotational angles. For example, if the detected rotational angle corresponding to the reference position where the intake valve is fully-closed has deviated, the failure diagnosis cannot be performed accurately. Therefore, by using the detected value corrected based on the relationship between the reference position and the detected rotational angle, the failure diagnosis can be performed accurately.

In some embodiments, the control system further includes angular speed parameter calculating means for calculating a first angular speed parameter ($\omega$MOT) indicative of a rotational angular speed of the motor output shaft and a second angular speed parameter ($\omega$CS) indicative of a rotational angular speed of the control shaft according to the rotational angles detected by the first and the second rotational angle detecting means. The failure diagnosis means performs the failure diagnosis based on the first and second angular speed parameters ($\omega$MOT, $\omega$CS).

With this configuration, the first angular speed parameter indicative of the rotational angular speed of the motor output shaft and the second angular speed parameter indicative of the rotational angular speed of the control shaft are calculated according to the rotational angles detected by the first and the second rotational angle detecting means, and the failure diagnosis is performed based on the first and the second angular speed parameters. By using the angular speed parameters, the diagnosis can be performed accurately without correcting the relationship between the detected rotational angle and the reference position.

The failure diagnosis means can include first abnormality detecting means for detecting an abnormality of the first rotational angle detecting means (72). The control means calculates an alternative value (θCS×RD) of the rotational angle detected by the first rotational angle detecting means (72) according to the rotational angle (θCS) detected by the second rotational angle detecting means (14) when an abnormality of the first rotational angle detecting means (72) is detected, and continues the lift amount control using the calculated alternative value.

With this configuration, when an abnormality of the first rotational angle detecting means is detected, the alternative value of the rotational angle detected by the first rotational angle detecting means is calculated according to the rotational angle detected by the second rotational angle detecting means, and the lift amount control is continued using the calculated alternative value. Accordingly, reliability of the lift amount control of the intake valve(s) can be improved.

The failure diagnosis means can also include second abnormality detecting means for detecting an abnormality of the second rotational angle detecting means (14). The control means calculates an alternative value (θMOT/RD) of the rotational angle detected by the second rotational angle detecting means (14) according to the rotational angle (θMOT) detected by the first rotational angle detecting means (72) when an abnormality of the second rotational angle detecting means (14) is detected, and continues the lift amount control using the calculated alternative value.

With this configuration, when an abnormality of the second rotational angle detecting means is detected, the alternative value of the rotational angle detected by the second rotational angle detecting means is calculated according to the rotational angle detected by the first rotational angle detecting means, and the lift amount control is continued using the calculated alternative value. Accordingly, reliability of the lift amount control of the intake valve(s) can be improved.

BRIEF DESCRIPTION OF THE DRAWINGS

FIG. 3 is a diagram for illustrating a configuration of the first valve operating characteristic varying mechanism shown in FIG. 2;

FIG. 7 is a time chart for illustrating a calculation method of a fully-closed position correction amount of the control shaft rotational angle;

FIG. 8 is a flowchart of a learning process for calculating the fully-closed position correction amount;

DETAILED DESCRIPTION OF THE PREFERRED EMBODIMENTS

Preferred embodiments of the present invention will now be described with reference to the drawings.

First Embodiment

Figure 1:
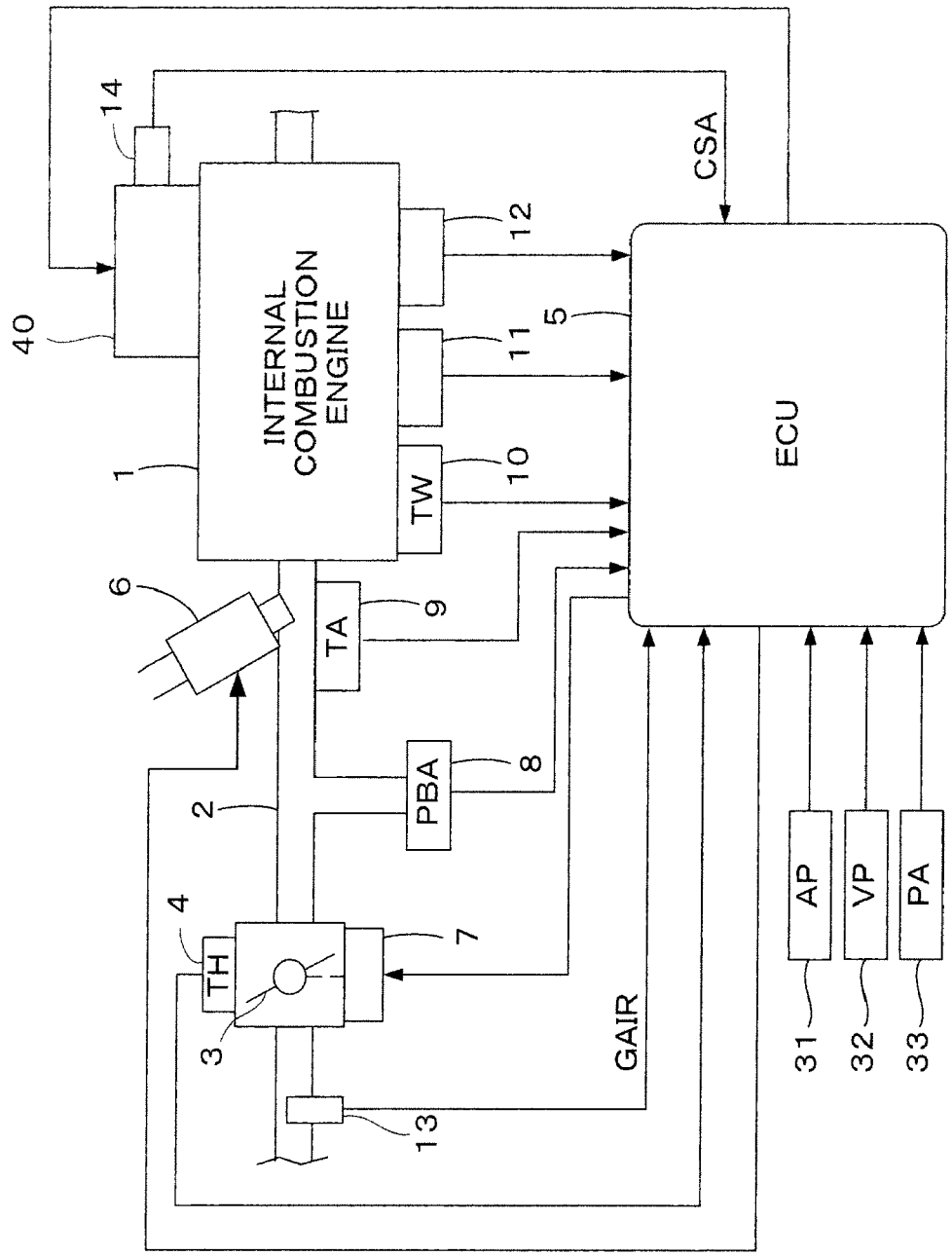
FIG. 1 is a schematic diagram showing a configuration of an internal combustion engine and a control system therefor according to one embodiment of the present invention.
Figure 2:
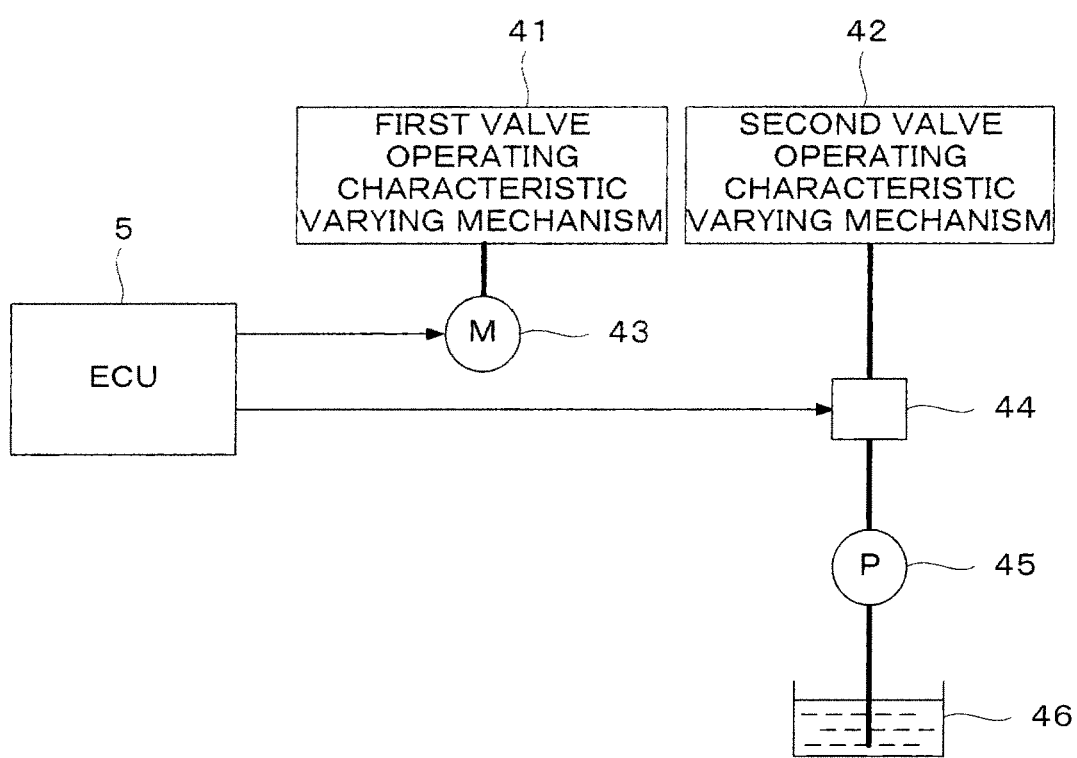
FIG. 2 is a schematic diagram showing a configuration of the valve operating characteristic varying device shown in FIG. 1.

FIG. 1 is a schematic diagram showing a configuration of an internal combustion engine and a control system therefor according to one embodiment of the present invention, and FIG. 2 is a schematic diagram showing a configuration of a valve operating characteristic varying device. Referring Co FIG. 1, an internal combustion engine (hereinafter referred to as "engine") 1 having, for example, four cylinders is provided with intake valves and exhaust valves, and cams for driving the intake valves and the exhaust valves. The engine 1 is provided with a valve operating characteristic varying device 40 having a first valve operating characteristic varying mechanism 41 and a second valve operating characteristic varying mechanism 42. The first valve operating characteristic varying mechanism 41 continuously varies the valve lift amount and the opening angle (valve opening period) of the intake valve. The second valve operating characteristic varying mechanism 42 is a cam phase varying mechanism for continuously varying the operating phases of the cams for driving the intake valves with reference to a rotational angle of the crank shaft of the engine 1. The second valve operating characteristic varying mechanism 42 varies the operating phase of the cam for driving each intake valve, and consequently varies the operating phase of each intake valve.

The engine 1 has an intake pipe 2 provided with a throttle valve 3. A throttle valve opening (TH) sensor 4 is connected to the throttle valve 3, outputs an electrical signal corresponding to an opening of the throttle valve 3, and supplies the electrical signal to an electronic control unit (referred to as "ECU") 5. An actuator 7 for actuating the throttle valve 3 is connected to the throttle valve 3, and the operation of the actuator 7 is controlled by the ECU 5.

Fuel injection valves 6 are inserted into the intake pipe 2 at locations between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of the crankshaft (not shown) of the engine 1, and the cam angle position sensor 12 is provided to detect a rotational angle of a camshaft to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 30 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used for control of various timings such as a fuel injection timing and an ignition timing, and for detection of an engine rotational speed NE. An actual operating phase CAIN of the camshaft is detected from the correlation between the TDC pulse output from the cam angle position sensor 12 and the CRK pulse output from the crank angle position sensor 11.

An accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (this depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

In one embodiment, the valve operating characteristic varying device 40, as shown in FIG. 2, includes a first valve operating characteristic varying mechanism 41, a second valve operating characteristic varying mechanism 42, a motor 43, and a solenoid valve 44. The first valve operating characteristic varying mechanism 41 continuously varies a lift amount and an opening angle (hereinafter referred to simply as "lift amount LFT") of each intake valve. The second valve operating characteristic varying mechanism 42 continuously varies an operating phase of each intake valve. The motor 43 is provided for continuously changing the lift amount LFT of each intake valve. An opening of the solenoid valve 44 is continuously variable for changing the operating phase of each intake valve. The operating phase CAIN of the camshaft is used as a parameter indicative of the operating phase of the intake valve. A lubricating oil contained in an oil pan 46 is pressurized by an oil pump 45, and supplied to the solenoid valve 44. It is to be noted that a specific configuration of the second valve operating characteristic varying mechanism 42 is described, for example, in Japanese Patent Laid-open No. 2000-227013.

As shown in FIG. 3A, the first valve operating characteristic varying mechanism 41 can include a camshaft 51, a control arm 55, a control shaft 56, a sub-cam 53, and a rocker arm 54. The camshaft 51 is provided with a cam 52. The control arm 55 is supported by the cylinder head so that the control arm 55 can pivot around a shaft 55a. The control shaft 56 is provided with a control cam 57 which pivots the control arm 55. The sub-cam 53 is supported by the control arm 55 through a supporting shaft 53b so that the sub-cam 53 can pivot around the supporting shaft 53b. The sub-cam 53 is actuated by the cam 52. The rocker arm 54 is actuated by the sub-cam 53 and drives (opens and closes) an intake valve 60. The rocker arm 54 is supported in the control arm 55 so that the rocker arm 54 can pivot.

The sub-cam 53 has a roller 53a abutting the cam 52, and pivots around the shaft 53b by rotation of the camshaft 51. The rocker arm 54 has a roller 54a abutting the sub-cam 53. The movement of the sub-cam 53 is transmitted to the rocker arm 54 through the roller 54a.

The control arm 55 has a roller 55b abutting the control cam 57, and pivots around the shaft 55a by rotation of the control shaft 56. In the state shown in FIG. 3A, the intake valve 60 maintains a substantially fully-closed state, since the movement of the sub-cam 53 is not substantially transmitted to the rocker arm 54. On the other hand, in the state shown in FIG. 3B, the movement of the sub-cam 53 is transmitted to the intake valve 60 through the rocker arm 54, and the intake valve 60 opens to a maximum lift amount LFTMAX (e.g., 12 mm).

Therefore, the lift amount LFT of the intake valve 60 can be continuously varied by pivoting the control shaft 56 with the motor 43. In this embodiment, the first valve operating characteristic varying mechanism 41 includes a control shaft rotational angle sensor 14 for detecting a rotational angle (hereinafter referred to as "CS angle") $\theta CS$ of the control shaft 56. The detected CS angle $\theta CS$ is used as a parameter indicative of the lift amount LFT.

It is to be noted that the detailed configuration of the first valve operating characteristic varying mechanism 41 is described, for example, in Japanese Patent Laid-open No. 2008-25418.

Figure 4A:
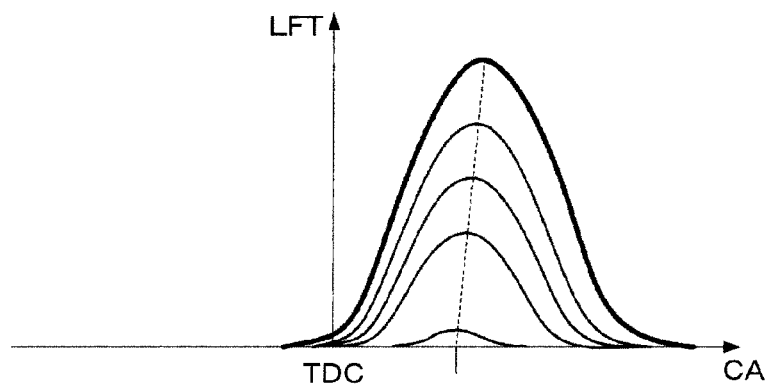
FIG. 4 is a graph showing valve operating characteristics of the intake valve.
Figure 4B:
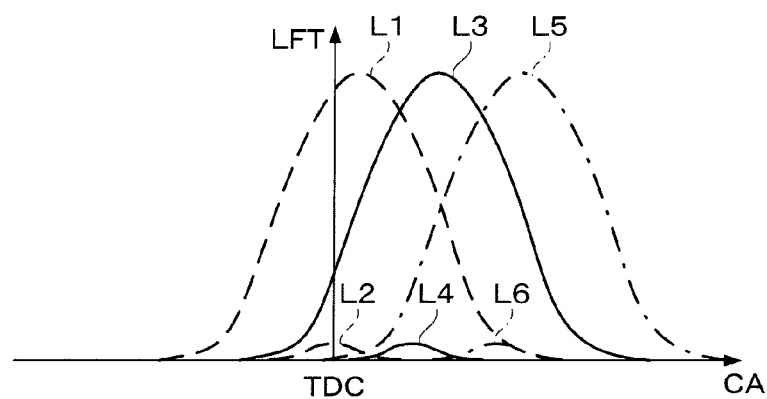

According to the first valve operating characteristic varying mechanism 41, as shown in FIG. 4A, the lift amount LFT (and the opening angle) of the intake valve is varied. Further, according to the second valve operating characteristic varying mechanism 42, the intake valve is driven with a phase from the most advanced phase, shown by the broken lines L1 and L2 in FIG. 4B to the most retarded phase, shown by the dot-and-dash lines L5 and L6 in FIG. 4B, depending on a change in the operating phase CAIN of the camshaft. In FIG. 4B, the characteristics shown by the solid lines L3 and L4 are the center of the variable phase range.

Figure 5:
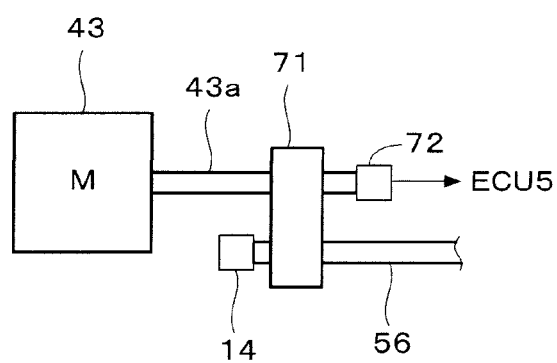
FIG. 5 is a schematic diagram showing a configuration of a connecting portion of the first valve operating characteristic varying mechanism and a motor for driving the mechanism.

As shown in FIG. 5, the driving force of the motor 43 is transmitted to the control shaft 56 through a transmission mechanism 71 from a motor output shaft 43a. The control shaft 56, as described above, is provided with the CS angle sensor 14 for detecting the CS angle $\theta CS$. Further in this embodiment, the motor output shaft 43a is provided with a motor output shaft rotational angle sensor (hereinafter referred to as "MOT angle sensor") 72 for detecting a rotational angle of the motor output shaft 43a (this rotational angle will be hereinafter referred to as "MOT angle") $\theta MOT$, and the detection signal of the sensor 72 is also supplied to the ECU 5. For example, an angle sensor using magnetic resistance elements is used as the CS angle sensor 14, and a resolver is used as the MOT angle sensor 72.

The ECU 5 of this example includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the motor 43, and the solenoid valve 44.

The CPU in the ECU 5 controls an opening of the throttle valve 3, an amount of fuel to be supplied to the engine 1 (the opening period of each fuel injection valve 6), and the valve operating characteristic (intake air flow rate) through the motor 43 and the solenoid valve 44 according to the detected signals from the above-described sensors.

In the lift amount control (CS angle control) of the intake valve, a lift amount command value LFTCMD of the intake valve is calculated according to an engine operating condition, and a CS angle command value θCSCMD is calculated according to the lift amount command value LFTCMD. Further, a feedback control of a drive current IMD of the motor 43 is performed so that the detected CS angle θCS coincides with the CS angle command value θCSCMD.

Further, the ECU 5 performs a failure diagnosis of the CS angle sensor 14, the MOT angle sensor 72, and the transmission mechanism 71 based on the detection values of the CS angle sensor 14 and the MOT angle sensor 72.

Figure 6:
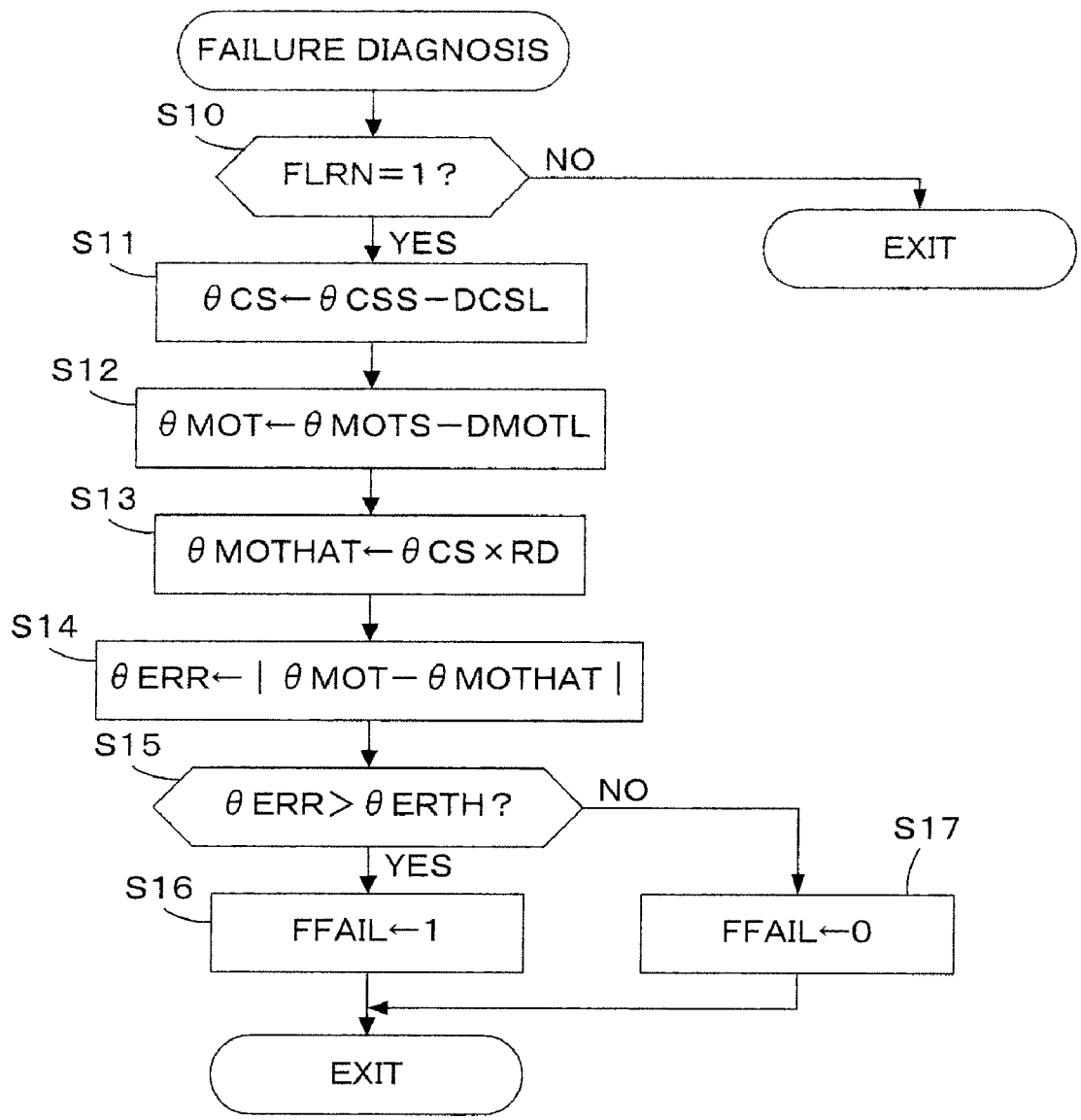
FIG. 6 is a flowchart of a process (first embodiment) for performing a failure diagnosis of sensors (14, 72) which detect rotational angles of the motor output shaft and the control shaft, and a transmission mechanism (71)

FIG. 6 is a flowchart of an example of a process for performing the failure diagnosis, and this process is executed at predetermined time intervals by the CPU in the ECU 5.

In step S10, it is determined whether or not a learning flag FLRN is equal to "1". The learning flag FLRN is set to "1" when the learning of the fully-closed position for the CS angle sensor 14 and the MOT angle sensor 72 has completed by the process of FIG. 8. In the process of FIG. 7, a first fully-closed position correction amount DCSL and a second fully-closed position correction amount DMOTL are calculated. The first fully-closed position correction amount DCSL and the second fully-closed position correction amount DMOTL respectively indicate detection values of the CS angle sensor 14 and the MOT angle sensor 72 corresponding to an angle position where the intake valve is fully-closed (this angle position will be hereinafter referred to as "fully-closed angle position"). If the learning flag FLRN is equal to "0", i.e., the calculation of the correction amounts DCSL and DMOTL has not completed, the process immediately ends.

IF the learning flag FLRN is equal to "1", a sensor output θCSS of the CS angle sensor 14 and the first fully-closed position correction amount DCSL are applied to the following equation (1), to calculate the CS angle θCS (step S11).

$$\theta CS = \theta CSS - DCSL \qquad (1)$$

In step S12, a sensor output θMOTS of the MOT angle sensor 72 and the second fully-closed position correction amount DMOTL are applied to the following equation (2), to calculate the MOT angle θMOT (step S12).

$$\theta MOT = \theta MOTS - DMOTL \qquad (2)$$

By steps S11 and S12, the CS angle θCS and the MOT angle θMOT, which are corrected with respect to the fully-closed angle position, are obtained.

In step S13, the CS angle θCS is applied to the following equation (3), to calculate an estimated MOT angle θMOTHAT. In the equation (3), "RD" is a reduction ratio of the transmission mechanism 71. In this embodiment, θCS is greater than θMOT, and the reduction ratio RD is set to a value greater than "1.0"

$$\theta MOTHAT = \theta CS \times RD \qquad (3)$$

In step S14, the MOT angle θMOT and the estimated MOT angle θMOTHAT are applied to the following equation (4), to calculate an angle deviation θERR.

$$\theta ERR = |\theta MOT - \theta MOTHAT| \qquad (4)$$

In step S15, it is determined whether or not the angle deviation θERR is greater than an angle threshold value θERTH. If the answer to step S15 is negative (NO), the sensors 14, 72, and the transmission mechanism 71 are determined to be normal, and a failure flag FFAIL is set to "0" (step S17). On the other hand, if the angle deviation θERR is greater than the angle threshold value θERTH, it is determined that at least one of the sensors 14, 72, and the transmission mechanism 71 has failed, and the failure flag FFAIL is set to "1" (step S16).

Next, a method for calculating the above-described first fully-closed position correction amount DCSL and the second fully-closed position correction amount DMOTL will be described. In this embodiment, a fully-closed position stopper is provided on the control shaft 56, and if the control shaft 56 pivots to reach the fully-closed angle position, the control shaft 56 is stopped by the fully-closed position stopper. Therefore, when the control shaft 56 is stopped by the fully-closed position stopper, the sensor output θCSS of the CS angle sensor 14 and the sensor output θMOTS of the MOT angle sensor 72 are respectively calculated as the first fully-closed position correction amount DCSL and the second fully-closed position correction amount DMOTL.

However, if the motor output torque for pivoting the control shaft 56 to the fully-closed position stopper is too great, there is a possibility of damaging the fully-closed position stopper. On the other hand, if the motor output torque is too small, there is a possibility that the control shaft 56 stops before reaching the fully-closed position stopper. In order to prevent such problems, a feedback control is performed so that an angular speed of the control shaft 56 when pivoting (this angular speed will be hereinafter referred to as "CS angular speed") ωCS is made to coincide with a command value ωCSCMD. When a deviation Dω between the detected angular speed ωCS and the command value ωCSCMD reaches a value which is equal to or greater than a predetermined value Dω TH, it is determined that the control shaft 56 has reached the fully-closed position stopper. Consequently, the control shaft 56 is made to accurately stop at the fully-closed angle position, thereby obtaining an accurate value of the fully-closed position correction amount.

FIG. 7 is a time chart for illustrating a learning process for calculating the first and the second fully-closed position correction amounts DCSL and DMOTL. The solid line and the dashed line in FIG. 7A respectively show changes in the CS angular speed ωCS and the command value ωCSCMD. Further, FIGS. 7B and 7C respectively show changes in the CS angle θCS and the output torque TMOT of the motor 43. When the learning process is started at time t1, the command value ωCSCMD is set to a predetermined speed ω LRN, and the CS angular speed ωCS follows the command value ωCSCMD. When the control shaft 56 reaches the fully-closed position stopper at time t2, the CS angular speed ωCS rapidly decreases and the deviation Dω exceeds the predetermined value Dω TH. Consequently, it is determined that the control shaft has reached the fully-closed position, and operation of the motor 43 is stopped.

FIG. 8 is a flowchart of the learning process for calculating the first and the second fully-closed position correction amounts DCSL and DMOTL. This process is executed by the CPU in the ECU 5 at predetermined time intervals when a predetermined execution condition is satisfied. The predetermined execution condition includes at least the following two conditions. One is that the engine 1 has stopped. Another condition, which is applied after the learning is once completed, is that the vehicle driven by the engine 1 has run a distance greater than a predetermined distance from the time the learning is completed.

In step S21, a feedback control of the motor drive current is performed so that the control shaft 56 is actuated in the direction of the fully-closed position stopper, to make the CS angular speed ωCS coincide with the command value ωCSCMD. The CS angular speed ωCS is calculated as a change amount of the CS angle θCS per constant time period. For example, by using a discrete time k digitized with an execution period T of the process of FIG. 8, ωCS is calculated by the following equation (5).

$$\omega CS = \theta CS(k) - \theta CS(k-1) \quad (5)$$

In step S22, the speed deviation Dω is calculated by the following equation (6).

$$D\omega = |\omega CS - \omega CSCMD| \quad (6)$$

In step S23, it is determined whether or not the speed deviation Dω is equal to or greater than the predetermined value Dω TH. Since the control shaft 56 is pivoting while the answer to step S23 is negative (NO), the process immediately ends. If the speed deviation Dω becomes equal to or greater than the predetermined value Dω TH in step S23, it is determined that the control shaft 56 has reached the fully-closed angle position. Then, the fully-closed position correction amounts DCSL and DMOTL are respectively set to present values of the CS angle sensor output θCSS and the MOT angle sensor output θMOTS (step S24), and the learning flag FLRN is set to "1" (step S25).

Figure 9:
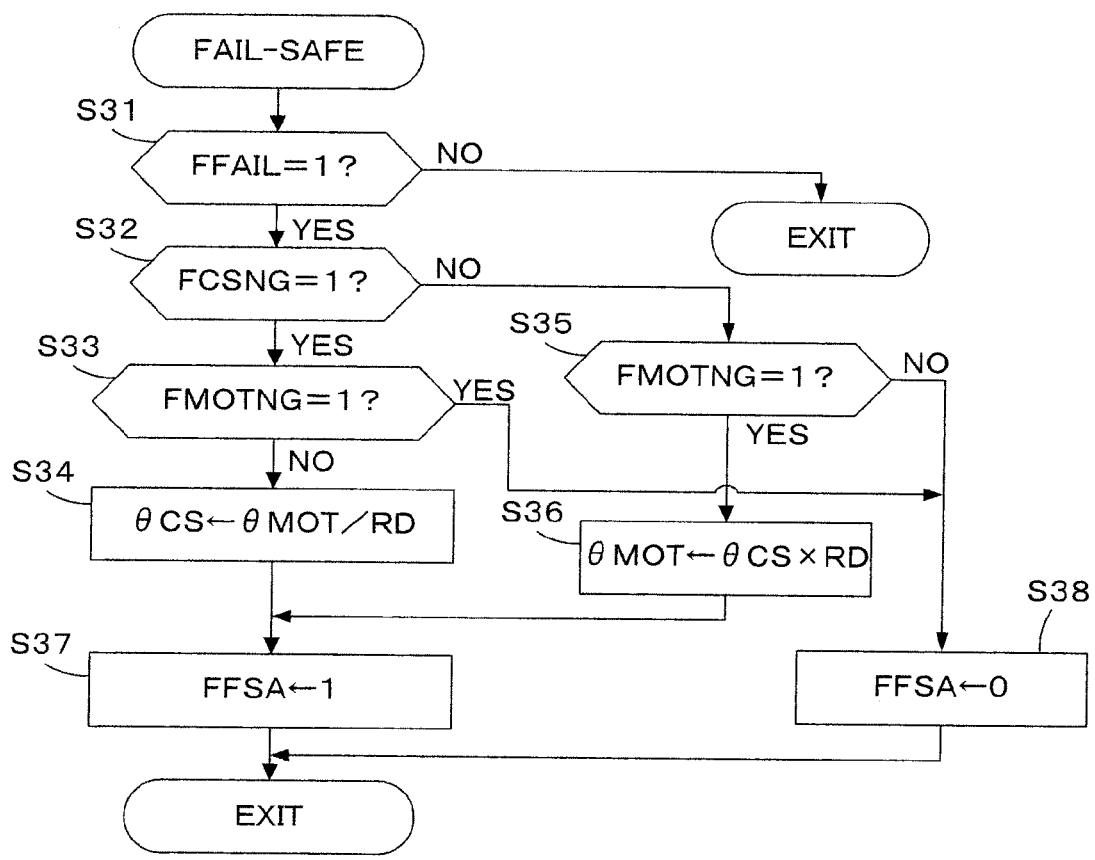
FIG. 9 is a flowchart of a fail-safe process executed when a failure is detected.

FIG. 9 is a flowchart of a process for performing a fail-safe operation when the failure is detected by the process of FIG. 6. This process is executed by the CPU in the ECU 5 at predetermined time intervals.

In step S31, it is determined whether or not the failure flag FFAIL is equal to "1". If the answer to step S31 is negative (NO), the process immediately ends. If the failure flag FFAIL is equal to "1", it is determined whether or not a first sensor abnormality flag FCSNG is equal to "1" (step S32). The first sensor abnormality flag FCSNG is set to "1" by another process (not shown) when an abnormality of the CS angle sensor 14 (for example, an abnormality that the sensor output is fixed to a constant voltage) is detected.

If the answer to step S32 is affirmative (YES), it is determined whether or not a second sensor abnormality flag FMOTNG is equal to "1" (step S33). The second sensor abnormality flag FMOTNG is set to "1" by another process (not shown) when an abnormality of the MOT angle sensor 72 (for example, an abnormality that the sensor output is fixed to a constant voltage) is detected.

If the answer to step S33 is negative (NO), i.e., the MOT angle sensor 72 is normal and the CS angle sensor 14 is abnormal, the CS angle θCS is set to an alternative value calculated by the following equation (7) using the MOT angle θMOT (step S34).

$$\theta CS = \theta MOT / RD \quad (7)$$

In step S37, a fail-safe operation flag FFSA is set to "1", which indicates that the fail-safe operation is being performed.

If the first sensor unusual flag FCSNG is equal to "0" in step S32, the same determination as that in step S33 is performed in step S35. If the answer to step S35 is affirmative (YES), i.e., the CS angle sensor 14 is normal and the MOT angle sensor 72 is abnormal, the MOT angle θMOT is set to an alternative value calculated by the following equation (8) using the CS angle θCS (step S34). Thereafter, the process proceeds to step S37.

$$\theta MOT = \theta CS \times RD \quad (8)$$

If the second sensor abnormality flag FMOTNG is equal to "1" in step S33, i.e., both of two sensors 14 and 72 are abnormal, or if the second sensor abnormality flag FMOTNG is equal to "0" in step S35, i.e., both of the two sensors 14 and 72 are normal, the fail-safe operation flag FFSA is set to "0" (step S38).

When the fail-safe operation flag FFSA is set to "1", the lift amount control of the intake valves is continued using the alternative value.

In this embodiment as described above, the failure diagnosis of the CS angle sensor 14, the MOT angle sensor 72, and the transmission mechanism 71 is performed based on the detected values of the CS angle sensor 14 and the MOT angle sensor 72. Since the rotational angles are detected by the MOT angle sensor 72 and the CS angle sensor 14 which are provided respectively on the input side and the output side of the transmission mechanism 71, it is possible to diagnose not only a failure of the sensors 14 and 72 but also a failure of the transmission mechanism 71 by comparing the detected values θMOT and θCS of the two sensors.

Further, the first and the second fully-closed position correction amounts DCSL and DMOTL, which are respectively the CS angle sensor output and the MOT angle sensor output corresponding to the fully-closed angle position, are calculated. Subsequently, the failure diagnosis is performed based on the CS angle θCS and MOT angle θMOT corrected respectively with the fully-closed position correction amounts DCSL and DMOTL. Therefore, even if a difference exists between the two sensor outputs corresponding to the fully-closed angle position, it is possible to accurately perform the failure diagnosis.

Further, when an abnormality of the CS angle sensor 14 is detected, the alternative value of the CS angle sensor 14 is calculated according to the detected value of the MOT angle sensor 72 and the lift amount control is continued using the alternative value. On the other hand, when the abnormality of the MOT angle sensor 72 is detected, the alternative value of the MOT angle is calculated according to the detected value of the CS angle sensor 14 and the lift amount control is continued using the alternative value. Therefore, reliability of the lift amount control of the intake valves is improved.

In this embodiment, the MOT angle sensor 72, and the CS angle sensor 14 respectively correspond to the first rotational angle detecting means and the second rotational angle detecting means. The ECU 5 functions as the control means, the failure diagnosis means, the correcting means, the first abnormality detecting means, and the second abnormality detecting means. Specifically, steps S13 to S17 of FIG. 6 correspond to the failure diagnosis means, and steps S11 and S12 of FIG. 6 and the process of FIG. 8 correspond to the correcting means.

Second Embodiment

Figure 10:
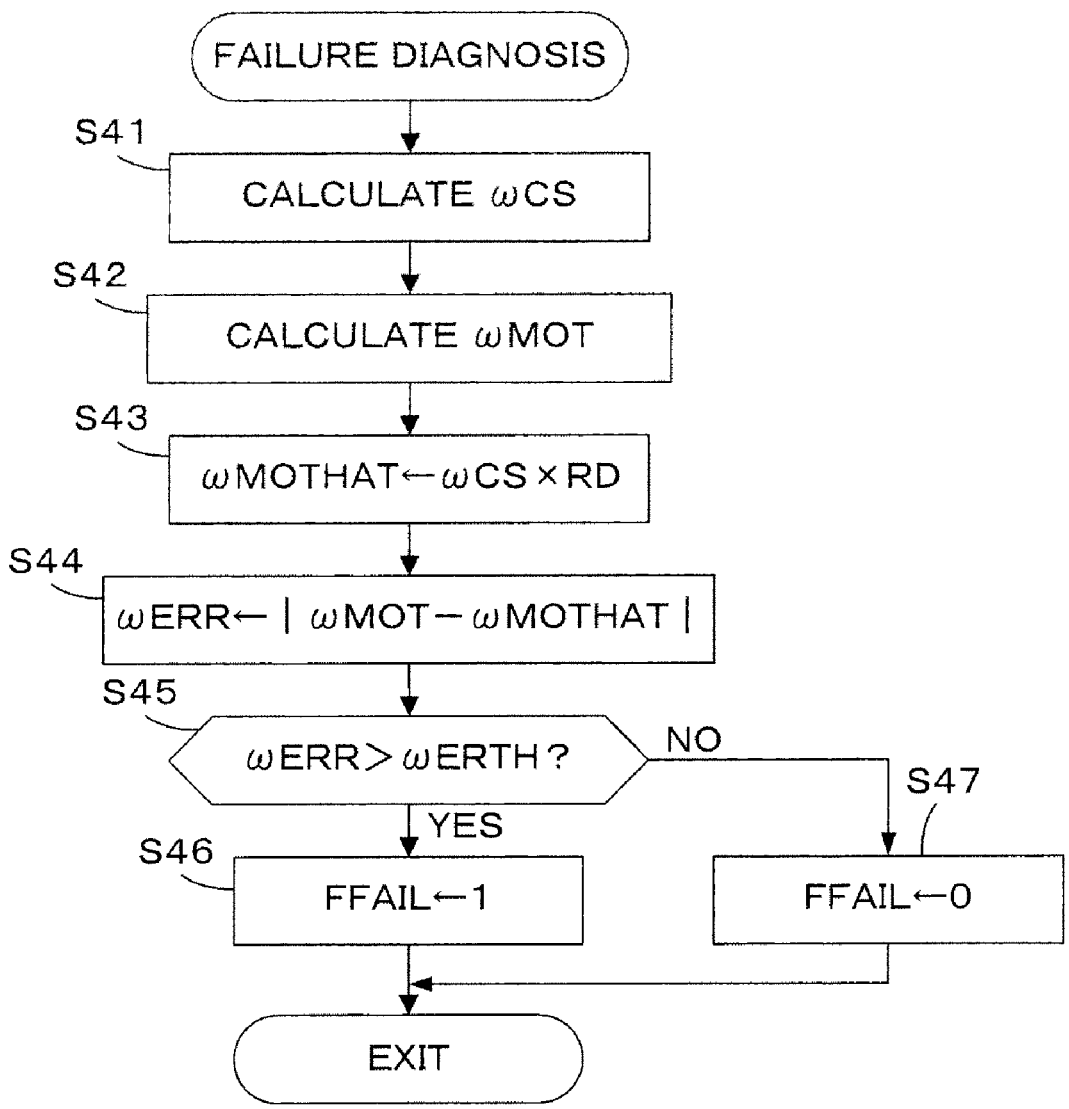
FIG. 10 is a flowchart of a process (second embodiment) for performing a failure diagnosis of sensors (14, 72) which detect rotational angles of the motor output shaft and the control shaft, and the transmission mechanism (71)

In this embodiment, the failure diagnosis process (FIG. 6) in the first embodiment is replaced with a process shown in FIG. 10. Except for this point, this embodiment is the same as the first embodiment.

In step S41 of FIG. 10, the CS angular speed ωCS is calculated by the following equation (9).

$$\omega CS = \theta CSS(k) - \theta CSS(k-1) \quad (9)$$

In step S42, the MOT angular speed ωMOT which is a rotational angular speed of the motor output shaft is calculated by the following equation (10).

$$\omega MOT = \theta MOTS(k) - \theta MOTS(k-1) \quad (10)$$

Although the sensor outputs θCSS and θWOTS are applied to the above equations (9) and (10), the CS angle θCS and the MOT angle θMOT, which are corrected with the fully-closed position correction amount, may be applied.

In step S43, the CS angular speed ωCS is applied to the following equation (11), to calculate the estimated MOT angular speed ωMOTHAT.

$$\omega MOTHAT = \omega CS \times RD \quad (11)$$

In step S44, the MOT angular speed ωMOT and the estimated MOT angular speed ωMOTHAT are applied to the following equation (12), to calculate the angular speed deviation ωERR.

$$\omega ERR = |\omega MOT - \omega MOTHAT| \qquad (12)$$

In step S45, it is determined whether or not the angular speed deviation ωERR is greater than the angular speed threshold value ωERTH. If the answer to step S45 is negative (NO), the sensors 14, 72, and the transmission mechanism 71 are determined to be normal, and the failure flag FFAIL is set to "0" (step S47). On the other hand, if the angular speed deviation ωERR is greater than the angular speed threshold value ωERTH, it is determined that at least one of the sensors 14, 72, and the transmission mechanism 71 has failed, and the failure flag FFAIL is set to "1" (step S46).

According to the process of FIG. 10, the failure diagnosis is performed based on the CS angular speed ωCS and the MOT angular speed ωMOT. Therefore, the failure diagnosis is accurately performed without the correction with the first fully-closed position correction amount DCSL and the second fully-closed position correction amount DMOTL in the process of FIG. 6.

In this embodiment, the process of FIG. 10 corresponds to the failure diagnosis means.

The present invention is not limited to the embodiments described above, and various modifications may be made. For example, the abnormality determination method of the CS angle sensor 14 and/or the MOT angle sensor 72 is not limited to above-described methods. Alternatively, the method described below may be applied to the abnormality determination.

Figure 11:
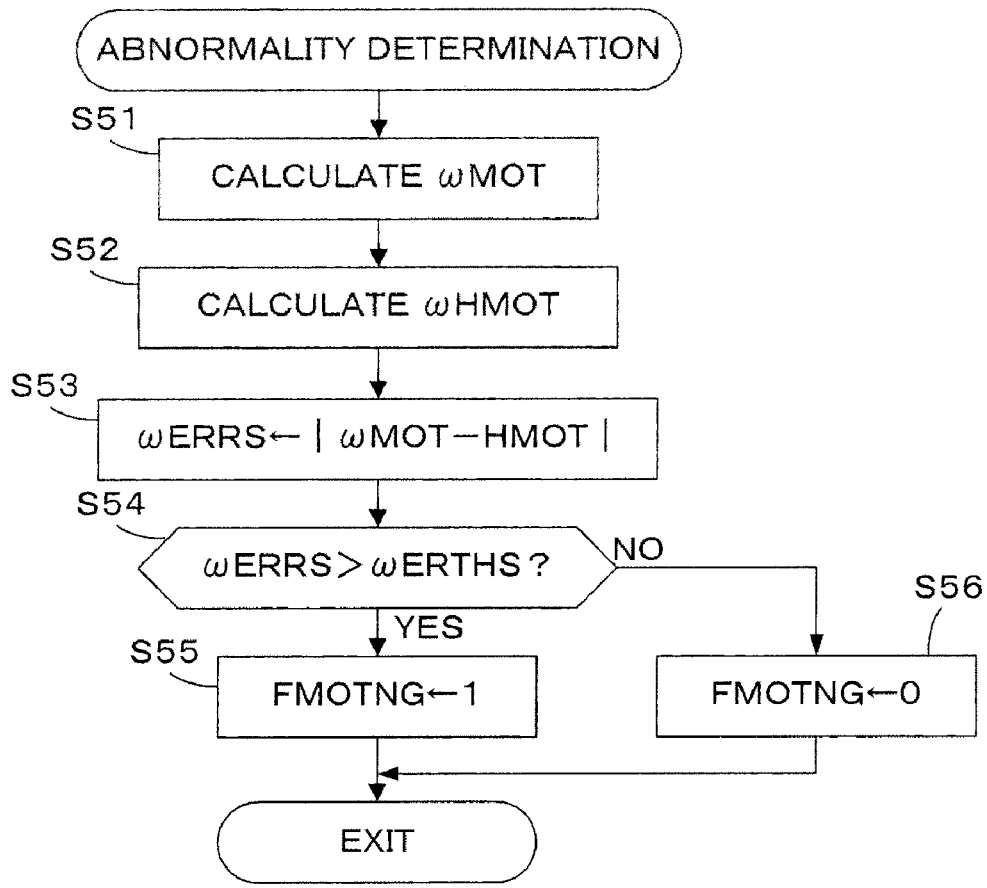
FIG. 11 is a flowchart of an abnormality determination process of the motor output shaft rotational angle sensor.

FIG. 11 is a flowchart of the abnormality determination process of the MOT angle sensor 72, and this process is executed by the CPU in the ECU 5 at predetermined time intervals, for example, when performing the learning process shown in FIG. 8. That is, the process is executed when the feedback control is performed so that the CS angular speed ωCS for rotate the control shaft 56 is made to coincide with the command value ωCSCMD.

In step S51, the MOT angular speed ωMOT is calculated by the above-described equation (10).

In step S52, a predicted angular speed HMOT is calculated according to an elapsed time period TFB from the time the above-described feedback control starts. The predicted angular speed HMOT is calculated, for example, using an exponential function directing to the target value (RD×ωCSCMD). The exponential function is preliminarily obtained by using the normal MOT angle sensor, and an example of the exponential function is shown by the dashed line of FIG. 12.

In step S53, the MOT angular speed ωMOT and the predicted angular speed HMOT are applied to the following equation (21), to calculate a sensor angular speed deviation ωERRS.

$$\omega ERRS = |\omega MOT - HMOT| \qquad (21)$$

In step S54, it is determined whether or not the sensor angular speed deviation ωERRS is greater than a sensor angular speed threshold value ωERTHS. If the answer to step S54 is negative (NO), the MOT angle sensor 72 is determined to be normal, and the second sensor abnormality flag FMOTNG is set to "0" (step S56). On the other hand, if the sensor angular speed deviation ωERRS is greater than the sensor angular speed threshold value ωERTHS, the MOT angle sensor 72 is determined to be abnormal, and the second sensor abnormality flag FMOTNG is set to "1" (step S55).

Figure 12:
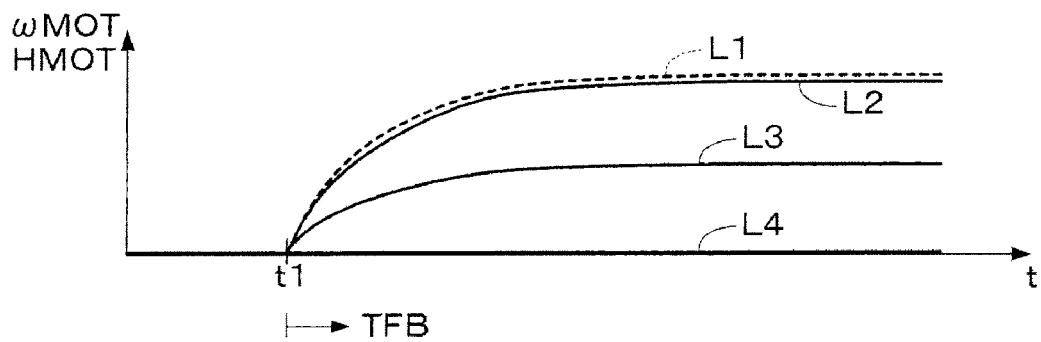
FIG. 12 is a time chart for illustrating the process of FIG. 11.

FIG. 12 is a time chart for illustrating the process of FIG. 11. The dashed line L1 corresponds to the predicted angular speed HMOT, and the solid line L2 corresponds to the MOT angular speed ωMOT when the sensors are normal. In the examples shown by the solid lines L3 and L4, the sensor angle speed ωERRS becomes greater than the sensor angular speed threshold value ωERTHS, and the MOT angle sensor 72 is determined to be abnormal.

It is to be noted that the abnormality determination of the CS angle sensor 14 may be performed with the same method. In this case, the feedback control is performed so that the MOT angular speed ωMOT is made to coincide with the command value ωMOTCMD, and the CS angular speed ωCS and the predicted angular speed HCS at that time are used. When an abnormality of the CS angle sensor 14 or the MOT angle sensor 72 is detected, it is preferable to perform a fail-safe action wherein the upper limit value of the engine rotational speed NE is changed to a value lower than the normal upper limit value and the upper limit value of the intake valve lift amount is changed to a value lower than the normal value.

Further, in the process shown in FIG. 6, the estimated MOT angle θMOTHAT is calculated according to the CS angle θCS and a difference between the estimated MOT angle θMOTHAT and the MOT angle θMOT is calculated as the angle deviation θERR. Alternatively, the estimated CS angle θCSHAT (=θMOT/RD) may be calculated according to the MOT angle θMOT, and a difference between the estimated CS angle θCSHAT and the CS angle θCS may be calculated as the angle deviation θERR.

Further, in the process shown in FIG. 10, the estimated MOT angular speed ωMOTHAT is calculated according to the CS angular speed ωCS, and a difference between the estimated MOT angular speed ωMOTHAT and the MOT angular speed ωMOT is calculated as the angular speed deviation θERR. Alternatively, the estimated CS angular speed ωCSHAT (=ωMOT/RD) may be calculated according to the MOT angular speed ωMOT, and a difference between the estimated CS angular speed ωCSHAT and the CS angular speed ωCS may be calculated as the angular speed deviation ωERR.

Further, in the above-described embodiments, the CS angle θCS is used as a parameter indicative of the lift amount LFT of the intake valve. Alternatively, the MOT angle θMOT may be used as a parameter indicative of the lift amount LFT, instead of the CS angle θCS. Furthermore, one of the CS angle θCS and the MOT angle θMOT may be suitably selected and used.

The present invention can be applied also to a control system for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a valve operating characteristic varying mechanism for continuously changing a lift amount of at least one intake valve of said engine, said valve operating characteristic varying mechanism including a control shaft for changing the lift amount, a motor for rotating said control shaft, and a transmission mechanism provided between an output shaft of said motor and said control shaft for transmitting an actuating force of said motor to said control shaft, said control system comprising:

first rotational angle detecting means for detecting a rotational angle of the output shaft of said motor;

second rotational angle detecting means for detecting a rotational angle of said control shaft;

control means for performing a control of the lift amount of said at least one intake valve according to the rotational angle detected by said first rotational angle detecting means or said second rotational angle detecting means; and failure diagnosis means for performing a failure diagnosis of said first rotational angle detecting means, said second rotational angle detecting means, and said transmission mechanism based on the rotational angles detected by said first and second rotational angle detecting means.

2. A control system according to claim 1, further comprising correcting means for correcting the rotational angles detected by said first and second rotational angle detecting means, based on a relationship between the detected rotational angles and reference positions of said motor output shaft and said control shaft, wherein said failure diagnosis means performs the failure diagnosis based on the rotational angles corrected by said correcting means.

3. A control system according to claim 1, further comprising angular speed parameter calculating means for calculating a first angular speed parameter indicative of a rotational angular speed of the motor output shaft and a second angular speed parameter indicative of a rotational angular speed of the control shaft according to the rotational angles detected by said first and the second rotational angle detecting means, wherein said failure diagnosis means performs the failure diagnosis based on the first and second angular speed parameters.

4. A control system according to claim 1, wherein said failure diagnosis means includes first abnormality detecting means for detecting an abnormality of said first rotational angle detecting means, wherein said control means calculates an alternative value of the rotational angle detected by said first rotational angle detecting means according to the rotational angle detected by said second rotational angle detecting means when an abnormality of said first rotational angle detecting means is detected, and continues the lift amount control using the calculated alternative value.

5. A control system according to claim 1, wherein said failure diagnosis means includes second abnormality detecting means for detecting an abnormality of said second rotational angle detecting means, wherein said control means calculates an alternative value of the rotational angle detected by said second rotational angle detecting means according to the rotational angle detected by said first rotational angle detecting means when an abnormality of said second rotational angle detecting means is detected, and continues the lift amount control using the calculated alternative value.

6. A control method for an internal combustion engine having a valve operating characteristic varying mechanism for continuously changing a lift amount of at least one intake valve of said engine, said valve operating characteristic varying mechanism including a control shaft for changing the lift amount, a motor for rotating said control shaft, and a transmission mechanism provided between an output shaft of said motor and said control shaft for transmitting an actuating force of said motor to said control shaft, said control method comprising:

a) detecting a rotational angle of the output shaft of said motor by a first rotational angle sensor;

b) detecting a rotational angle of said control shaft by a second rotational angle sensor;

c) performing a control of the lift amount of said at least one intake valve according to the rotational angle detected by said first rotational angle sensor or said second rotational angle sensor; and d) performing a failure diagnosis of said first rotational angle sensor, said second rotational angle sensor, and said transmission mechanism based on the rotational angles detected by said first and second rotational angle sensors.

7. A control method according to claim 6, further comprising:

e) correcting the rotational angles detected by said first and second rotational angle sensors, based on a relationship between the detected rotational angles and reference positions of said motor output shaft and said control shaft, wherein the failure diagnosis is performed based on the corrected rotational angles.

8. A control method according to claim 6, further comprising:

f) calculating a first angular speed parameter indicative of a rotational angular speed of the motor output shaft and a second angular speed parameter indicative of a rotational angular speed of the control shaft according to the rotational angles detected by said first and the second rotational angle sensors, wherein the failure diagnosis is performed based on the first and second angular speed parameters.

9. A control method according to claim 6, further comprising:

g) detecting an abnormality of said first rotational angle sensor; and h) calculating an alternative value of the rotational angle detected by said first rotational angle sensor according to the rotational angle detected by said second rotational angle sensor when an abnormality of said first rotational angle sensor is detected, wherein the lift amount control is continued using the calculated alternative value.

10. A control method according to claim 6, further comprising:

i) detecting an abnormality of said second rotational angle sensor; and j) calculating an alternative value of the rotational angle detected by said second rotational angle sensor according to the rotational angle detected by said first rotational angle sensor when an abnormality of said second rotational angle sensor is detected, wherein the lift amount control is continued using the calculated alternative value.

11. A computer program embodied on a computer-readable storage medium for causing a computer to implement a control method for an internal combustion engine having a valve operating characteristic varying mechanism for continuously changing a lift amount of at least one intake valve of said engine, said valve operating characteristic varying mechanism including a control shaft for changing the lift amount, a motor for rotating said control shaft, and a transmission mechanism provided between an output shaft of said motor and said control shaft for transmitting an actuating force of said motor to said control shaft, said control method comprising:

a) detecting a rotational angle of the output shaft of said motor by a first rotational angle sensor;
b) detecting a rotational angle of said control shaft by a second rotational angle sensor;
c) performing a control of the lift amount of said at least one intake valve according to the rotational angle detected by said first rotational angle sensor or said second rotational angle sensor; and
d) performing a failure diagnosis of said first rotational angle sensor, said second rotational angle sensor, and said transmission mechanism based on the rotational angles detected by said first and second rotational angle sensors.

12. A computer program according to claim 11, wherein said control method further comprises:
e) correcting the rotational angles detected by said first and second rotational angle sensors, based on a relationship between the detected rotational angles and reference positions of said motor output shaft and said control shaft, wherein the failure diagnosis is performed based on the corrected rotational angles.

13. A computer program according to claim 11, wherein said control method further comprises:
f) calculating a first angular speed parameter indicative of a rotational angular speed of the motor output shaft and a second angular speed parameter indicative of a rotational angular speed of the control shaft according to the rotational angles detected by said first and the second rotational angle sensors, wherein the failure diagnosis is performed based on the first and second angular speed parameters.

14. A computer program according to claim 11, wherein said control method further comprises:
g) detecting an abnormality of said first rotational angle sensor; and
h) calculating an alternative value of the rotational angle detected by said first rotational angle sensor according to the rotational angle detected by said second rotational angle sensor when an abnormality of said first rotational angle sensor is detected, wherein the lift amount control is continued using the calculated alternative value.

15. A computer program according to claim 11, wherein said control method further comprises:
i) detecting an abnormality of said second rotational angle sensor; and
j) calculating an alternative value of the rotational angle detected by said second rotational angle sensor according to the rotational angle detected by said first rotational angle sensor when an abnormality of said second rotational angle sensor is detected, wherein the lift amount control is continued using the calculated alternative value.

16. A control apparatus for an internal combustion engine having a valve operating characteristic varying mechanism for continuously changing a lift amount of at least one intake valve of the engine, with the valve operating characteristic varying mechanism including a control shaft for changing the lift amount, a motor for rotating the control shaft, and a transmission mechanism provided between an output shaft of the motor and the control shaft for transmitting an actuating force of the motor to the control shaft, the control apparatus comprising:
a first rotational angle detecting unit configured to detect a rotational angle of the output shaft of the motor; a second rotational angle detecting unit configured to detect a rotational angle of the control shaft;
a control unit configured to control the lift amount of the at least one intake valve according to the rotational angle detected by the first rotational angle detecting unit or the second rotational angle detecting unit; and
a failure diagnosis unit configured to perform a failure diagnosis of the first rotational angle detecting unit, the second rotational angle detecting unit, and the transmission mechanism based on the rotational angles detected by the first and second rotational angle detecting units.

17. A control apparatus according to claim 16, further comprising a correcting unit configured to correct the rotational angles detected by the first and second rotational angle detecting units, based on a relationship between the detected rotational angles and reference positions of the motor output shaft and the control shaft, wherein the failure diagnosis unit is configured to perform the failure diagnosis based on the rotational angles corrected by the correcting unit.

18. A control apparatus according to claim 16, further comprising an angular speed parameter calculating unit configured to calculate a first angular speed parameter indicative of a rotational angular speed of the motor output shaft and a second angular speed parameter indicative of a rotational angular speed of the control shaft according to the rotational angles detected by the first and second rotational angle detecting units, wherein the failure diagnosis unit is configured to perform the failure diagnosis based on the first and second angular speed parameters.

19. A control apparatus according to claim 16, wherein the failure diagnosis unit includes a first abnormality detecting unit configured to detect an abnormality of the first rotational angle detecting unit, wherein the control unit is configured to calculate an alternative value of the rotational angle detected by the first rotational angle detecting unit according to the rotational angle detected by the second rotational angle detecting unit when an abnormality of the first rotational angle detecting unit is detected, and continues the lift amount control using the calculated alternative value.

20. A control apparatus according to claim 16, wherein the failure diagnosis unit includes a second abnormality detecting unit configured to detect an abnormality of the second rotational angle detecting unit, wherein the control unit is configured to calculate an alternative value of the rotational angle detected by the second rotational angle detecting unit according to the rotational angle detected by the first rotational angle detecting unit when an abnormality of the second rotational angle detecting unit is detected, and continuous the lift amount control using the calculated alternative value.

* * * * *